United States Patent [19]

Johnson

[11] Patent Number: 4,529,423
[45] Date of Patent: Jul. 16, 1985

[54] TRAP FOR VAPORS FROM PLASTIC EXTRUDERS

[76] Inventor: Ronald L. Johnson, 1225 Mudbrook Rd., Huron, Ohio 44839

[21] Appl. No.: 642,546

[22] Filed: Aug. 20, 1984

[51] Int. Cl.³ .................. B01D 35/02; B01D 45/18
[52] U.S. Cl. .................................. 55/270; 55/319; 55/320; 55/429; 55/433; 55/463
[58] Field of Search ............. 55/270, 319, 320, 390, 55/428, 429, 432, 433, 463

[56] References Cited

U.S. PATENT DOCUMENTS

| | | | |
|---|---|---|---|
| 2,606,344 | 8/1952 | Clark | 55/433 X |
| 2,778,448 | 1/1957 | Graves | 55/429 X |
| 3,174,264 | 3/1965 | McKnab | 55/429 X |
| 3,345,807 | 10/1967 | von Felden | 55/433 |
| 3,492,795 | 2/1970 | Guerrieri | 55/463 |
| 3,618,297 | 11/1971 | Hamrick | 55/320 X |
| 3,923,483 | 12/1975 | Hilmer et al. | 55/463 |
| 4,236,903 | 12/1980 | Malmston | 55/463 X |
| 4,244,715 | 1/1981 | Eisenbarth | 55/319 X |

FOREIGN PATENT DOCUMENTS

| | | | |
|---|---|---|---|
| 1068221 | 11/1959 | Fed. Rep. of Germany | 55/320 |
| 810753 | 3/1959 | United Kingdom | 55/463 |

Primary Examiner—Robert H. Spitzer
Attorney, Agent, or Firm—Pearne, Gordon, Sessions, McCoy, Granger & Tilberry

[57] ABSTRACT

A phase separator or vapor trap is provided for use with a plastic extruder. The phase separator includes housing means which define a first chamber for separating hydrocarbon compounds from exhaust vapor, an internal conduit located within the first chamber, and a couple which joins extruder discharge conduit with the inlet of the internal conduit. The inlet means provides a larger cross-sectional area than the extruder vapor exhaust conduit. The first chamber includes a baffle which surrounds the internal conduit and further defines at least one flow opening. The aggregate cross-sectional area of the flow openings are substantially the same as the cross-sectional area of the discharge conduit. Diffusion means adjustably attached to the end of the internal conduit causes radial diffusion of the exhaust vapor within the first chamber. The housing also includes a removable collection receptacle to collect residue which condensates out of the exhaust vapor and camming catches to seal the collection receptacle with the rest of the housing. A single worker can simultaneously support the collection receptacle and form the seal between the collection receptacle and the rest of the housing.

14 Claims, 4 Drawing Figures

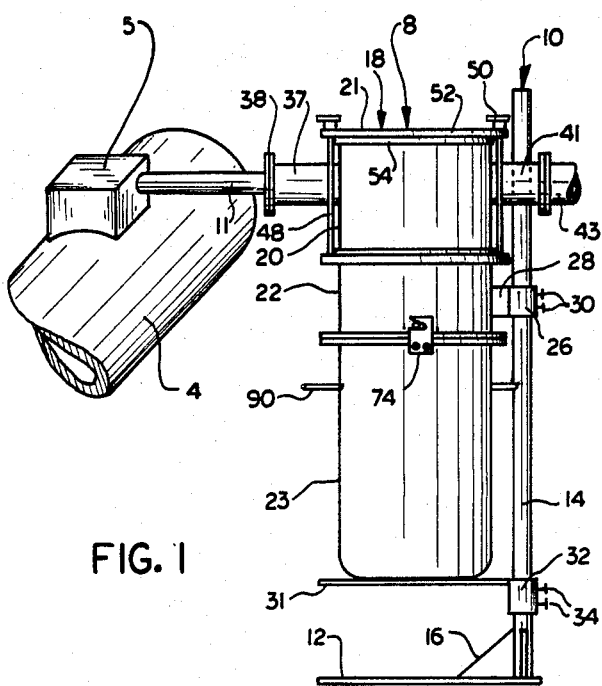
U.S. Patent   Jul. 16, 1985   4,529,423

4,529,423

TRAP FOR VAPORS FROM PLASTIC EXTRUDERS

BACKGROUND OF THE INVENTION

This invention relates to a trap for hydrocarbon vapors for use with plastic extruders.

In plastic extruders discharge vapors are pulled by a vacuum pump from the extruder just prior to the ejection of the hot plastic material from the extruder. If no trap is provided to catch the hydrocarbons which are included in the discharge vapors, either the hydrocarbons condense from the vapor stream and clog the discharge valve, or the vapors may be charged to the air causing an increase in potentially harmful hydrocarbon effluent in the work area, or the vapors may be dissolved into the water of the vacuum pump to pollute it and cause a problem in the disposal of that water. In addition, the vapor discharge often includes expensive additives such as plastic stabilizers which, if collected, could be saved and reused.

Other vapor traps have been employed, but they are not efficient and require continual attention, such as emptying the trap or unclogging the conduit into the vacuum pump. Some traps, for example, have to be emptied at least every thirty minutes. The conduits into the vacuum pump, in some installations, must be cleared on an equally frequent basis. This presents a disruption in the use of the extruder, and requires a worker to keep a constant eye on the vapor trap, vacuum pump, and related system.

It is an advantage to provide a vapor trap which allows for the proper cooling steps and dwell time to cause hydrocarbon vapors to condensate from a discharge stream in a sump area of the vapor trap, leaving the extruder discharge pipe or conduit free from clogging.

The trap must allow for the removal of the thick hydrocarbon condensate, but still be able to withstand a relatively high vacuum. It is an additional advantage if the trap can be emptied by a single worker, and if the worker can reconnect the trap by himself after the trap has been emptied.

SUMMARY OF THE INVENTION

This invention provides a trap to collect the hydrocarbon condensate in the discharge stream of an extruder machine which is used, for example, with PVC and ABS and similar thermoplastic materials. The device includes a canister type housing which is pressure tight to a vacuum of more than 23 inches and which has an inlet pipe or conduit leading from the extruder and an outlet pipe or conduit leading to a liquid ring vacuum pump.

The trap utilizes the cooling method caused by the expansion of the vapors. The inlet conduit receives the discharge vapor from the extruder through a discharge pipe. As the vapors pass from the extruder pipe into the inlet pipe or conduit of the vapor trap, the very hot vapors are immediately expanded to cause some initial cooling of the vapors.

The inlet conduit leads to a conduit which is disposed within the vapor trap canister. The internal conduit ends in an aperture or orifice located within the cooling area of the canister. A diffuser cone is adjustably disposed within this aperture to cause diffusion of the vapors as they are expelled from the internal conduit.

The vapors are expelled from the internal conduit into the cooling area of the canister, and expand into this much larger area. The cooling resulting from the expansion of the gases causes hydrocarbons to condensate out and to collect as a liquid or molten plastic in the sump area at the bottom of the canister.

A baffle is provided which separates the cooling area from the point in the canister where the inlet pipe or conduit and outlet pipe or conduit are joined to the canister. The baffle has a central opening which surrounds the internal chamber, as well as a plurality of flow openings. The aggregate area of the flow openings is equal to the total cross-sectional area of the discharge pipe. As a result, vapors are not drawn too rapidly from the trap by the vacuum pump. The vapors are therefore in the trap long enough to cool sufficiently so that the hydrocarbons will condensate out of the vapor. It is critical that the discharge be subject to the flow speeds and dwell time in the trap so that, on one hand, the hydrocarbons do not condensate and clog the discharge outlet and, on the other hand, they condensate out in the trap instead of in the vacuum pump. The inlet conduit has a larger cross-sectional area which is equal to the cross-sectional area of the outlet conduit.

The canister is designed to include a collection receptacle which forms a tight seal with the remainder of the canister. The collection receptacle includes handles and a plurality of camming catches. By rotating the collection receptacle, the worker can engage the catch with a locking pin in order to cause a pressure tight seal of the collection receptacle with the remainder of the canister, and to form a pressure tight canister at a relatively high vacuum.

The collection receptacle is cleaned out about once every eight-hour shift.

BRIEF DESCRIPTION OF THE DRAWINGS

FIG. 1 is a front plan view of the vapor trap mounted to an extruder machine;

FIG. 2 is a cross-sectional view taken along line 2—2 in FIG. 1;

FIG. 3 is a fragmentary plan view of the baffle taken along line 3—3 in FIG. 2; and FIG. 4 is a detailed view of the catch as indicated by line 4—4 in FIG. 2.

DETAILED DESCRIPTION OF THE PREFERRED EMBODIMENT

Referring now to the drawings, and particularly to FIG. 1, a vapor trap 8 is connected to a vacuum box 5 which collects hot vapors from the plastic being extruded ahead of the extruder die. The extruder 4 is used with plastics such as PVC and ABS.

The vapor tray 8 includes a support 10 which holds the vapor trap at the proper level so that the vapor trap may be joined to the discharge pipe or conduit 11 from the vacuum box 5 of the extruder 4. The support 10 includes a base 12 and a support rod 14. The support rod 14 is welded to the base 12 and is stabilized in its vertical position by struts 16.

The vapor trap canister of housing 18 is formed of three hollow sections and a cover. When assembled together, these form an interior chamber 42. A top inlet/outlet section 20 includes the inlet conduit 37 and outlet conduit 41. This section is closed on one end by the cover 21. The inlet/outlet section 20 (FIG. 1) is joined on the other side to the mounting section 22. The mounting section 22 is joined to the pot-shaped collection receptacle 23 having a sump 25 in the bottom. The mounting section 22 and the collection receptacle 23 form a cooling area 24 for the collection of the condensate. The cooling area 24 may be anywhere from twice to five times as large as the top inlet/outlet section 20.

The mounting section 22 is secured to the support 10 by means of a support collar 26 which cooperates with the support rod 14. A web 28 extends between the mounting section 22 and the support collar 26. The mounting section is held at the proper height on the support rod 14 by the screws 30. The canister 18 is further supported by a platform 31 on which it rests. The platform 31 is held in position on the support rod 14 by a platform support collar 32. Screws 34 hold this collar 32 in place on the rod 14.

The extruder discharge pipe 11 is connected to the vapor trap inlet conduit or pipe 37. The diameter of the vapor trap inlet conduit 37 is twice the size of the diameter of the discharge pipe 11 from the extruder vacuum box 5. For example, if a discharge pipe is used with a one-inch diameter bore, the inlet conduit will have a two-inch diameter bore. The discharge pipe 11 and the inlet conduit 37 are coupled together by means of a coupling 38.

An outlet conduit or pipe 41 is directly opposite from the inlet conduit 37. The outlet conduit 41 has the same cross-sectional area as the inlet conduit 37. The outlet conduit 41 joins the chamber 42 inside the canister 18 with a vacuum pump by means of a coupling 43. The vacuum pump could be, for example, a liquid ring vacuum pump which is water injected and pulls a pressure inside the chamber 42 of at least 23 inches, and preferably 29 inches, of mercury.

The inlet/outlet section 20 includes a cover 21 which is held in a pressure tight relation to the canister by means of clamping rods 48. The cover 21 includes holes (not shown) through which the clamping rods 48 project. Knobs 50 are fed onto threads 49 on the clamping rods 48 so that as the knobs 50 are tightened, a top sealing flange 52 formed around the periphery of the cover 21 is brought into sealing contact with an O-ring 53 disposed between the bottom of the top sealing flange 52 and a bottom sealing flange 54 extending laterally from the top inlet/outlet section 20.

The pressure within the chamber 42 is monitored by means of a pressure gauge 46 located on the cover 21 which seals the inlet/outlet section 20.

Clamping rods 48 cause a similar sealing engagement between the mounting section 22 and the top inlet/outlet section 20. The clamping rods 48 are mounted from the periphery of a bottom sealing flange 59 extending from the top of the mounting section 22. A top sealing flange 58 extends from the bottom of the inlet/outlet section 20. A baffle 57, which extends across the chamber 42 within canister 18, is held between the top sealing flange 58 and the bottom sealing flange 59 and helps to form a pressure tight seal between the inlet/outlet section 20 and the mounting section 22.

The mounting section 22 also includes a sealing flange 65 which cooperates with the sealing flange 67 of the collection receptacle 23, and by means of an O-ring 69 disposed therebetween forms a pressure tight seal. The collection receptacle 23 is held in position against the mounting section 22 by two or more equally spaced camming type catches 74.

The catch 74 is mounted by means of flanged bolts 82 to a mounting block 84 which extends laterally from the collection receptacle 23. Spaced apart from the bolts is a recess 78 which forms a hook to engage the locking pin 76. The top lateral edge of the recess 78 forms a camming surface for engagement with the locking pin 76 so that as the collection receptacle 23 and subsequently the catch 74 are rotated toward the locking pin, the locking pin 76 engages the camming surface 80 to cause a pressure tight seal between the collection receptacle and the mounting section 22.

Similarly the collection receptacle can be disengaged from the mounting section 22 by simply rotating the collection receptacle 23, and subsequently the catch 74, in the opposite direction from tightening. Two oppositely opposed laterally extending handles 90 are provided for the rotation of the collection receptacle 23.

A diffuser assembly 92 diffuses the vapors which are expelled from the interior conduit 39 into the cooling area 24. This assembly 92 consists of a diffuser cone 93 which is secured so that the apex projects into the aperture 88 of the interior conduit 39. The cone 93 is suspended by means of tying rods 94 from a mounting ring 98 extending laterally from a mounting collar 96 which is in threaded engagement with the outside of the interior conduit 39. Thus, the height of the cone relative to the height of the aperture 88 is adjustable to provide a smaller or greater annular space between the cone 93 and the aperture 88 by adjusting the height of the mounting collar 96 on the interior conduit 39. In a typical setting, the cone 93 may project into the aperture 88 to leave a ⅛ inch opening between the aperture 88 and the cone 93.

The baffle 57 is provided as shown in FIG. 3 with a central hole which houses the interior conduit 39, and with flow openings 108. The aggregate cross-sectional area of the flow openings 108 is equal to the cross-sectional area of the extruder discharge pipe 11.

Use of the vapor trap can be envisioned as follows: the vapor trap is mounted on the support rod and the support platform at a proper height to be coupled to an extruder by means of an extruder discharge pipe on one side, and on the other side to be coupled to a vacuum pump. Waste gases are drawn from the extruder at a fairly high temperature, i.e., from about 450° to about 475° F. These vapors or gases are discharged through the extruder discharge pipe 9 and expanded into inlet conduit 37. The vapors flow through the inlet conduit 37 into the interior conduit 39 positioned normal to the inlet conduit 37 within the chamber 42 of the canister 18.

The vapors are expelled through the interior conduit aperture 8 and are caused to be radially diffused by the diffuser assembly 92. The vapors expand into the cooling area 24 of the chamber 42, and as they expand, they cool, causing the hydrocarbons to condensate out and to collect in the bottom of the cooling area 24 in the sump 25. The temperature in the sump 25 is about 120° F.

The purified vapors are pulled from the cooling area 24 through the flow openings 108 in the baffle 57, through the outlet conduit 41 and on to the vacuum pump. The pressure gauge 46 is used to monitor the internal pressure of the chamber 42. The vacuum must be at least 23 inches, and is preferably 29 inches, of mercury.

When it is time to empty the condensate from the collection receptacle 23, the worker can proceed as follows: the screws 34 of the platform support collar 32 are loosened and the support collar 32 and platform 31 are lowered. The worker then grabs the handles 90 of the collection receptacle 23 counterclockwise and rotates the collection receptacle 23 counterclockwise (in the case where the catch is open to the left) to disengage the latches 74. The collection receptacle is removed and the condensate is collected. Because of the use of the cam-type catch and the extending handles, a single worker can simultaneously support and unfasten or fasten the collection receptacle 23 to the mounting section 22.

In order to re-engage the collection receptacle 23, the worker grasps the handles 90 and puts the collection receptacle 23 into position so that the locking pin 76 engages the recess 78 of the catch 74. As the worker rotates the collection receptacle clockwise by means of the handles 90, the locking pin 76 engages the camming surface 80 of the catch 74, which causes an increasingly tighter seal between the mounting section 22 and the collection receptacle 23. The trap should be emptied about once every eight hours.

Although the preferred embodiment of this invention has been shown and described, it should be understood that various modifications and rearrangements of the parts may be resorted to without departing from the scope of the invention as disclosed and claimed herein.

What is claimed is:

1. A phase separator for use with a plastic extruder having a vapor exhaust conduit joined to a vacuum pump, comprising:
    housing means defining a first chamber for separating hydrocarbon compounds from exhaust vapor;
    an internal conduit located within the first chamber having an aperture within the first chamber;
    inlet means for conducting exhaust vapor to the internal conduit;
    first coupling means which couple the extruder vapor discharge conduit with the inlet means, the inlet means providing a substantially larger cross section than the extruder vapor discharge conduit to cause a decrease in the temperature of the exhaust vapor;
    second coupling means which couple the first chamber to the vacuum pump;
    diffusion means cooperating with the aperture of the internal conduit to cause radial diffusion of the exhaust vapor within the first chamber;
    the first chamber including a baffle which surrounds the internal conduit and further defining at least one flow opening, the cross-sectional area of the flow opening or the aggregate cross-sectional area of all of the openings being substantially the same as the cross-sectional area of the discharge conduit;
    the housing including a collection receptacle having a sump portion to collect hydrocarbon residue which condensates out of the exhaust vapor;
    the housing including means to removably join the collection receptacle to the rest of the housing, and means to form a seal of the collection receptacle and the rest of the housing, the seal holding a vacuum of at least 23 inches of mercury;
    means to measure the pressure within the housing; and
    a support for the phase separator.

2. A phase separator as claimed in claim 1, wherein the diffusion means cooperates with but is spaced apart from the aperture of the internal conduit, and includes means to adjust the space between the diffusion member and the aperture.

3. A phase separator as claimed in claim 1, wherein the diffusion means comprises a cone.

4. A phase separator as claimed in claim 3, wherein the cone is suspended from a mounting ring which extends laterally from a mounting collar which is in threaded engagement with the outside of the internal conduit.

5. A phase separator as claimed in claim 1, including means for an individual worker to simultaneously support the collection receptacle and form the seal between the collection receptacle and the rest of the housing.

6. A phase separator as claimed in claim 5, wherein the means to form a seal comprises a catch which can be engaged by rotation of the collection receptacle relative to the housing portion.

7. A phase separator as claimed in claim 6, wherein the collection receptacle includes laterally extending handles.

8. A phase separator as claimed in claim 6, wherein the catch includes a camming surface and a locking pin such that the locking pin engages said camming surface to form a seal between the collection receptacle and the rest of the housing.

9. A phase separator as claimed in claim 5, wherein the catch causes said collection receptacle to be biased against the rest of said housing.

10. A phase separator for use with a plastic extruder having a vapor discharge conduit joined to a vacuum pump, the phase separator being located between the vapor exhaust conduit and the vacuum pump, comprising:
    housing means including a top inlet/outlet section, an intermediate support section and a sump section which together define a first chamber for separating hydrocarbon compounds for exhaust vapors;
    an internal conduit located within the first chamber;
    inlet means located in the vicinity of the top inlet/outlet section of the housing means for conducting exhaust vapor to the internal conduit;
    first coupling means which couple the extruder vapor discharge conduit with the inlet means, the inlet means providing a substantially larger cross-sectional area than the extruder vapor discharge conduit to cause a decrease in the temperature of the exhaust vapor;
    outlet means located in the vicinity of the top inlet/outlet section of the housing means for conducting vapor from the first chamber;
    second coupling means which couple the outlet means to the vacuum pump;
    the first chamber including a baffle extending substantially across the first chamber between the top inlet/outlet section and the intermediate support section, the baffle surrounding the internal chamber and further defining at least one flow opening, the cross-sectional area of the flow opening or the aggregate cross-sectional area of all of the flow openings being substantially the same as the cross-sectional area of said discharge conduit;
    the internal conduit defining an aperture located below the baffle;
    diffusion means cooperating with but spaced apart from the aperture of the internal conduit to cause radial diffusion of the exhaust vapor within the first chamber, the diffusion means including means to adjust the space between the diffusion member and said aperture;
    the housing including joining means to removably join and form a seal of said sump portion with the rest of said housing, the seal being capable of holding a vacuum of at least 23 inches, the joining means comprising catches which bias said sump portion to said intermediate support section; and means to measure the pressure within the housing.

11. A phase separator as claimed in claim 10, wherein the diffusion means comprises a cone.

12. A phase separator as claimed in claim 11, wherein the cone is suspended from a mounting ring which extends laterally from a mounting collar which is in threaded engagement with the outside of the internal conduit.

13. A phase separator as claimed in claim 10, wherein the collection receptacle includes laterally extending handles.

14. A phase separator as claimed in claim 10, wherein each of the catches includes a camming surface and a locking pin such that the locking pin engages the camming surface to form a seal between the collection receptacle and the rest of the housing.

* * * * *